(12) United States Patent
Zhou et al.

(10) Patent No.: US 8,903,771 B2
(45) Date of Patent: Dec. 2, 2014

(54) METHOD AND DEVICE FOR IMPORTING BACKUP DATA FOR A MOBILE TERMINAL

(75) Inventors: Baozhong Zhou, Guangdong (CN); Yang Ding, Guangdong (CN)

(73) Assignee: Huizhou TCL Mobile Communication Co., Ltd., Guangdong (CN)

( * ) Notice: Subject to any disclaimer, the term of this patent is extended or adjusted under 35 U.S.C. 154(b) by 36 days.

(21) Appl. No.: 13/634,759

(22) PCT Filed: Aug. 29, 2011

(86) PCT No.: PCT/CN2011/079066
§ 371 (c)(1),
(2), (4) Date: Sep. 13, 2012

(87) PCT Pub. No.: WO2012/028079
PCT Pub. Date: Mar. 8, 2012

(65) Prior Publication Data
US 2013/0013647 A1    Jan. 10, 2013

(30) Foreign Application Priority Data

Sep. 1, 2010    (CN) .......................... 2010 1 0278650

(51) Int. Cl.
G06F 7/00    (2006.01)
G06F 11/14    (2006.01)
(52) U.S. Cl.
CPC ................................. *G06F 11/1469* (2013.01)
USPC .......................................................... 707/641
(58) Field of Classification Search
USPC .......................................................... 707/641
See application file for complete search history.

(56) References Cited

U.S. PATENT DOCUMENTS

| 2007/0118540 | A1* | 5/2007 | Guo .............................. 707/100 |
| 2007/0250645 | A1* | 10/2007 | Meadows et al. ............. 709/248 |
| 2010/0274813 | A1* | 10/2010 | Lu et al. ........................ 707/792 |
| 2013/0073635 | A1 | 3/2013 | Cao |

FOREIGN PATENT DOCUMENTS

| CN | 1889595 A | 1/2007 |
| CN | 101252756 A | 8/2008 |
| CN | 101304573 A | 11/2008 |
| CN | 101426052 A | 5/2009 |
| CN | 101577900 A | 11/2009 |
| CN | 101729675 A | 6/2010 |
| CN | 101931706 A | 12/2010 |

OTHER PUBLICATIONS

International Search Report mailed Dec. 8, 2011 for PCT/CN2011/079066.

* cited by examiner

*Primary Examiner* — Truong Vo
(74) *Attorney, Agent, or Firm* — Lowe Hauptman & Ham, LLP (57) ABSTRACT

The present invention involves a field of mobile terminals and discloses a method and a device for importing backup data for a mobile terminal. The method and device for importing backup data for the mobile terminal provided by the present invention is convenient for a user to manage, simple to operate and easy to implement since the message data of the mobile terminal pre-stored in the xml file are used and classified to be imported to the mobile terminal.

16 Claims, 6 Drawing Sheets

METHOD AND DEVICE FOR IMPORTING BACKUP DATA FOR A MOBILE TERMINAL

CROSS REFERENCE TO RELATED APPLICATION

This application claims the priority of Chinese Patent Application No. 201010278650.4, filed on Sep. 1, 2010 in the SIPO (State Intellectual Property Office of the P.R.C). Further, this application is the National Phase application of International Application No. PCT/CN2011/079066 filed Aug. 29, 2011, which designates the United States and was published in Chinese.

TECHNICAL FIELD OF THE INVENTION

The present invention relates to a field of mobile terminals, and more particularly to a method and device for importing backup data for a mobile terminal.

BACKGROUND OF THE INVENTION

Nowadays, mobile communication devices are widely used. As various communication modes develop and requirements of personal business increase, the personal information quantity stored in a mobile communication terminal becomes larger and larger. Due to the limitations of storage quantities, screen size and operations, more and more data such as contact lists, short messages and the like, make the users feel difficult to manage. Further, there is not a perfect solution to import mobile terminal backup data being offered at present.

Therefore, currently existing techniques need to be improved and developed.

SUMMARY OF THE INVENTION

Aiming at the above defects of the prior art, the technical problem to be solved by the present invention is to provide a method and device for importing backup data for a mobile terminal, which conveniently realizes classified import of mobile terminal backup data that is prepared in advance, so that it is easy for a user to manage, as well as simpler operations that are easy to implement.

A technical solution utilized by the present invention to solve the technical problems is as follows:

A method for importing backup data for a mobile terminal, characterized in that, the method comprises:
A. reading an xml file of pre-stored mobile terminal backup data, and checking if the xml file is complete, go to step F if no complete, and go to step B if complete;
B. determining whether to import phone book data, if yes, access a phone book importing flow to import the phone book data in the xml file to a phone book of a mobile terminal; otherwise if no, access a short message importing determination and then go to step C;
C. determining whether to import short message data, if yes, access a short message importing flow to import short message data in the xml file to short messages of the mobile terminal, otherwise if no, go to step D to access a multimedia message importing determination;
D. determining whether to import multimedia message data, if yes, access a multimedia message importing flow to import multimedia message data in the xml file to multimedia messages of the mobile terminal, otherwise if no, go to step F;
E. determining whether imports of all data have been completed, if no, then return to step B to execute a determination for a next classification, and if yes, go to step F;
F. ending the entire importing flow.

In the method for importing backup data for the mobile terminal, the phone book data importing flow in the step B particularly comprises steps of:
B1. reading phone book elements in the xml file one by one;
B2. determining if a read phone book element is valid, if NO, go to step B1 to read a next phone book element, and if YES, go to step B3;
B3. interpreting the read phone book element into codes which are suitable for the mobile terminal to store, and adding the interpreted phone book data to the phone book of the mobile terminal;
B4. determining if the import of the phone book data is complete, returning to step B1 if NO, and go to step E if YES.

In the method for importing backup data for the mobile terminal, the short message importing flow in the step C particularly comprises steps of:
C1. reading short message elements in the xml file one by one;
C2. determining if a read short message element is valid, if NO, go to step C1 to read a next short message element, and if YES, go to step C3;
C3. interpreting the read short message element into codes which are suitable for the mobile terminal to store, and adding the interpreted short message data to the short messages of the mobile terminal;
C4. determining if the import of the short message data is complete, returning to step C1 if NO, and go to step E if YES.

In the method for importing backup data for the mobile terminal, the multimedia message importing flow in the step D particularly comprises steps of:
D1. reading multimedia message elements in the xml file one by one;
D2. determining if a read multimedia message element is valid, if NO, go to step D1 to read a next multimedia message element, and if YES, go to step D3;
D3. interpreting the read multimedia message element into codes which are suitable for the mobile terminal to store, and adding the interpreted multimedia message data to the multimedia messages of the mobile terminal;
D4. determining if the import of the multimedia message data is complete, if NO, go to step D1, and if YES, go to step E.

In the method for importing backup data for the mobile terminal, the xml file is encoded using UTF-8.

In the method for importing backup data for the mobile terminal, the phone book data comprise surname data, given name data, mobile phone number data, home phone data, office phone data and/or email address data.

In the method for importing backup data for the mobile terminal, the short message data comprise sender's number data, short message time data and/or message content data;

The multimedia message data comprise sender's number data, multimedia message time data, text message content data, image path data, video path data and/or audio file path data.

A device for importing backup data for a mobile terminal, characterized in that, comprising:
an xml file reading module for reading an xml file of pre-stored mobile terminal backup data;
an xml file detecting module for detecting if the read xml file of the pre-stored mobile terminal backup data is complete;

a phone book data importing module for determining whether to import phone book data and access a phone book data importing flow to import phone book data in the xml file into a phone book of the mobile terminal if yes;

a short message data importing module for determining whether to import short message data and access a short message importing flow to import short message data in the xml file into short messages of the mobile terminal if yes;

a multimedia message data importing module for determining whether to import multimedia message data and access a multimedia message importing flow to import multimedia message data in the xml file into multimedia messages of the mobile terminal if yes;

an import detecting module for determining whether all the data have been completely imported and ending the whole backup flow if yes.

In the device for importing backup data for the mobile terminal, the phone book data importing module comprises:

a phone book data reading unit for reading a phone book element in the xml file;

a phone book element determining unit for determining whether the read phone book element is valid;

a phone book data interpreting and adding unit for interpreting the read phone book element into codes which are suitable for the mobile terminal to store and adding the interpreted phone book data into the phone book of the mobile terminal;

a phone book data determining unit for determining whether the import of the phone book data is completed.

In the device for importing backup data for the mobile terminal, the short message data importing module comprises: a short message data reading unit for reading a short message element in the xml file; a short message element determining unit for determining whether the read short message element is valid; a short message data interpreting and adding unit for interpreting the read short message element into codes which are suitable for the mobile terminal to store and adding the interpreted short message data into the short messages of the mobile terminal; a short message data determining unit for determining whether the import of the short message data is completed.

the multimedia message data importing module comprises: a multimedia message data reading unit for reading a multimedia message element in the xml file; a multimedia message element determining unit for determining whether the read multimedia message element is valid; a multimedia message data interpreting and adding unit for interpreting the read multimedia message element into codes which are suitable for the mobile terminal to store and adding the interpreted multimedia message data into the short messages of the mobile terminal; a multimedia message data determining unit for determining whether the import of the multimedia message data is completed.

The method and device for importing backup data for a mobile terminal provided by the present invention use mobile terminal information data pre-stored in the xml file, classify the same and import into the mobile terminal, thereby being convenient for a user to manage, operations are simple and implementation is easy.

DETAILED DESCRIPTION OF THE INVENTION

The present invention provides a method and a device for importing backup data for a mobile terminal, mainly on encoding data in the mobile terminal with UTF-8 and storing the data in an xml file as a backup. When recovering and importing the data, the backup data in the xml file will be directly encoded into codes suitable for the mobile terminal and stored into the mobile terminal.

In order to make objectives, solutions and advantages of the present invention more clear and definite, embodiments of the present invention will be further described in detail with reference to the appended drawings. It should be understood that the embodiments are described only for explaining the present invention rather than limiting the present invention.

Figure 1A:
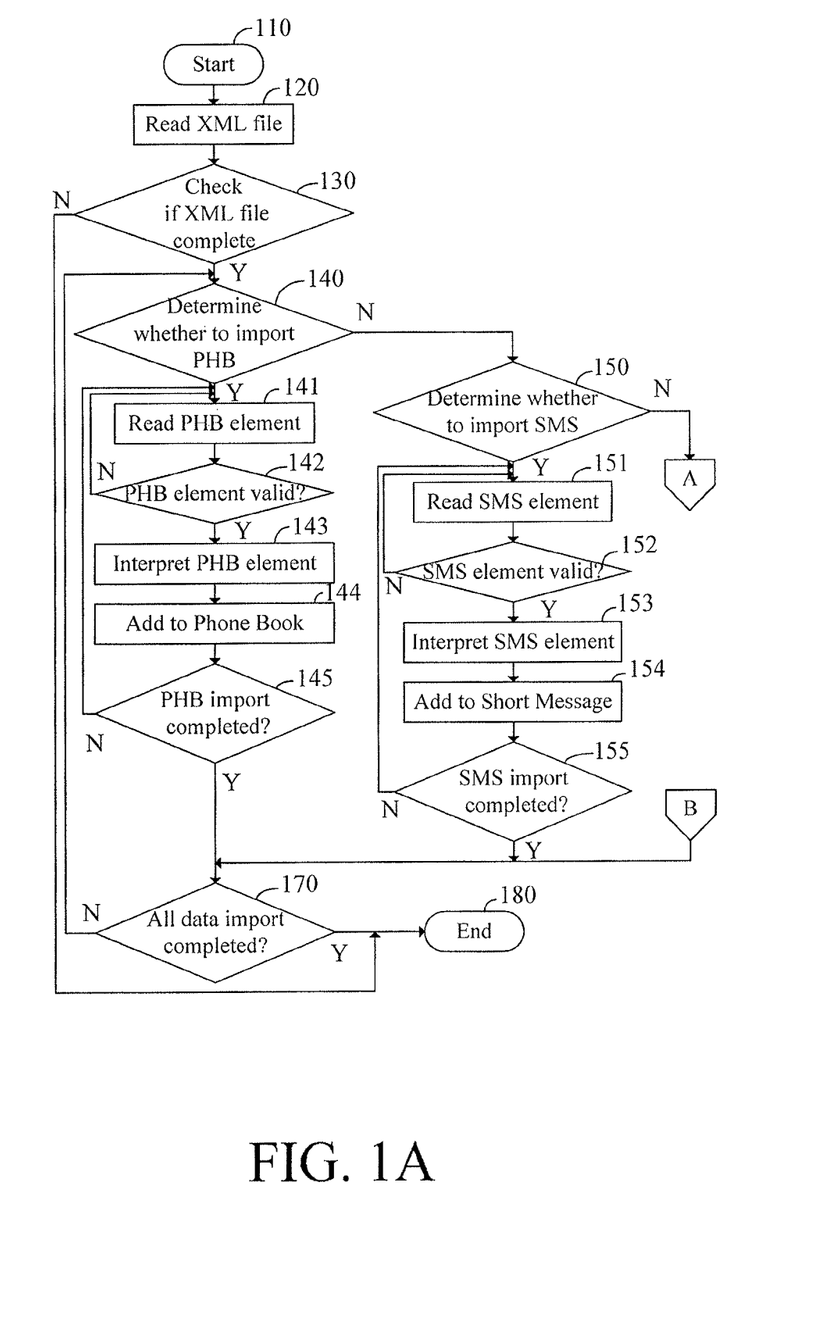
FIGS. 1A and 1B show a flow chart of a method for importing backup data for a mobile terminal in accordance with an embodiment of the present invention.
Figure 1B:
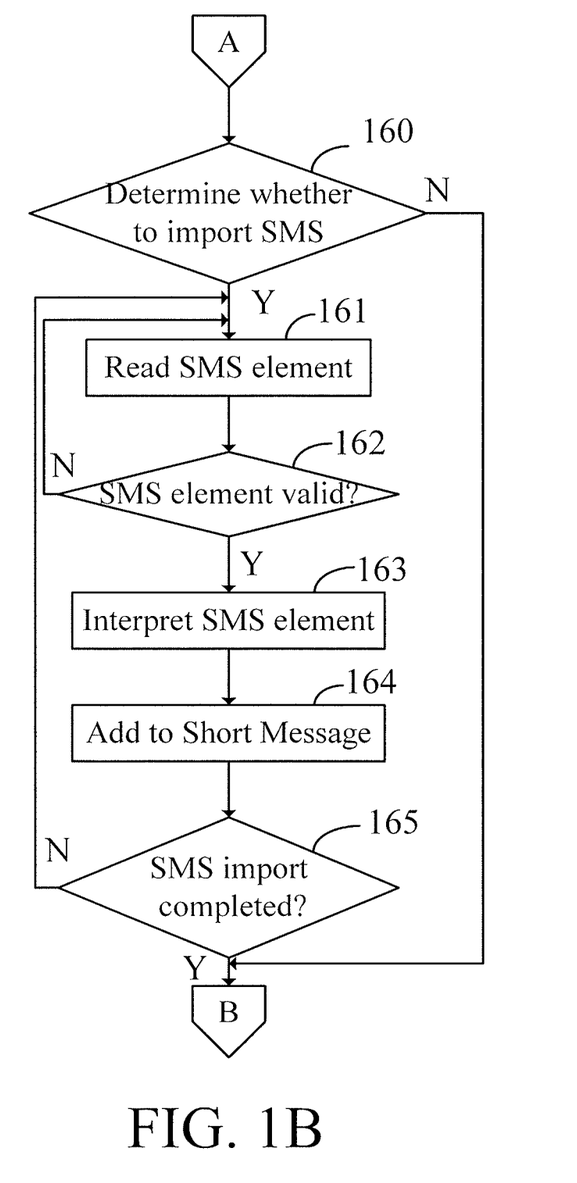

A method for importing backup data for a mobile terminal in accordance with the present invention is illustrated in FIG. 1, mainly comprises the following steps: abbreviations appearing in those steps are listed as follows:

PHB: Phone Book
SMS: Short Message Service
MMS: Multimedia Message Service
XML: Extensible Markup Language As shown in FIG. 1, the method comprises: Step S110. Prepared backup data of the mobile terminal are ready, data import flow starts.

Step S120. An xml file of the pre-stored backup data of the mobile terminal is read. The xml file is encoded using UTF-8.

Step S130. It is checked if the xml file is complete, and go to S180 if no, otherwise, go step S140 if yes.

Step S140. It is determined whether to import PHB (phone book) data, and if no, access an SMS (short message) import determination, otherwise, access PHB data import flow to import phone book data in the xml file to a phone book of the mobile terminal. The PHB data import flow comprises the following steps of S141, S142, S143, S144 and S145.

Step S141. PHB (phone book) elements in the xml file are read one by one.

Step S142. It is determined whether the PHB element is valid, and if no, go to step S141 to read the next PHB element, otherwise, go to step S143.

Step S143. The read PHB element is interpreted. The UTF-8 encoded data are converted into codes which are suitable for a mobile phone to store. Step S144. The interpreted PHB data are added to PHB. Steps S143 and S144 include interpreting the read phone book elements into the codes which are suitable for the mobile terminal to store and adding the interpreted phone book data to the phone book of the mobile terminal.

Step S145. It is determined whether the PHB import flow is completed, and go to step S141 to start repeating executions of steps S141, S142, S143, S144 and S145, otherwise, go to step S170 if yes.

Step S150. It is determined whether to import SMS (short message) data, and if no, go to MMS (multimedia message) import determination, otherwise if yes, go to SMS data import flow to import short message data in the xml file to short message contents of the mobile terminal. The SMS data import flow comprises the following steps of S151, S152, S153, S154 and S155.

Step S151. SMS (short message) elements in the xml file are read one by one.

Step S152. Further, it is determined whether the SMS element is valid, and returns to step S151 to read the next SMS element if no, otherwise, go to step S153.

Step S153. The read SMS element is interpreted. The UTF-8 encoded data are converted into codes which are suitable for a mobile phone to store. Step S154. The interpreted SMS data are added to the short messages. Steps S153 and S154 include interpreting the read short message elements into the codes which are suitable for the mobile terminal to store and adding the interpreted short message data to the short messages of the mobile terminal.

Step S155. It is determined whether the SMS import flow is completed, and go to step S151 to start repeating executions of steps S151, S152, S153, S154 and S155, otherwise, go to step S170 if yes.

Step S160. It is determined whether to import MMS (short message) data, and go to step S180 if no, otherwise, access MMS data import flow to import multimedia message data in the xml file to multimedia message contents of the mobile terminal if yes. The MMS data import flow comprises the following steps of S161, S162, S163, S164 and S165.

Step S161. MMS (multimedia message) elements in the xml file are read one by one.

Step S162. Further, it is determined whether the MMS element is valid, and returns to step S161 to read the next MMS element if no, otherwise, go to step S163.

Step S163. The read MMS element is interpreted. The UTF-8 encoded data are converted into codes which are suitable for a mobile phone to store. Step S164. The interpreted MMS data are added to the multimedia messages. Steps S163 and S164 include interpreting the read multimedia message elements into the codes which are suitable for the mobile terminal to store and adding the interpreted multimedia message data to the multimedia messages of the mobile terminal.

Step S165. It is determined whether the MMS import flow is completed, and go to step S161 to start repeating executions of steps S161, S162, S163, S164 and S165, otherwise, go to step S170 if yes.

Step S170. It is determined whether all the imports of data have been completed, and go to step S180 to end the whole flow, otherwise, go to step S140 to access determination for the next classification.

Step S180. The whole flow ends.

Figure 2:
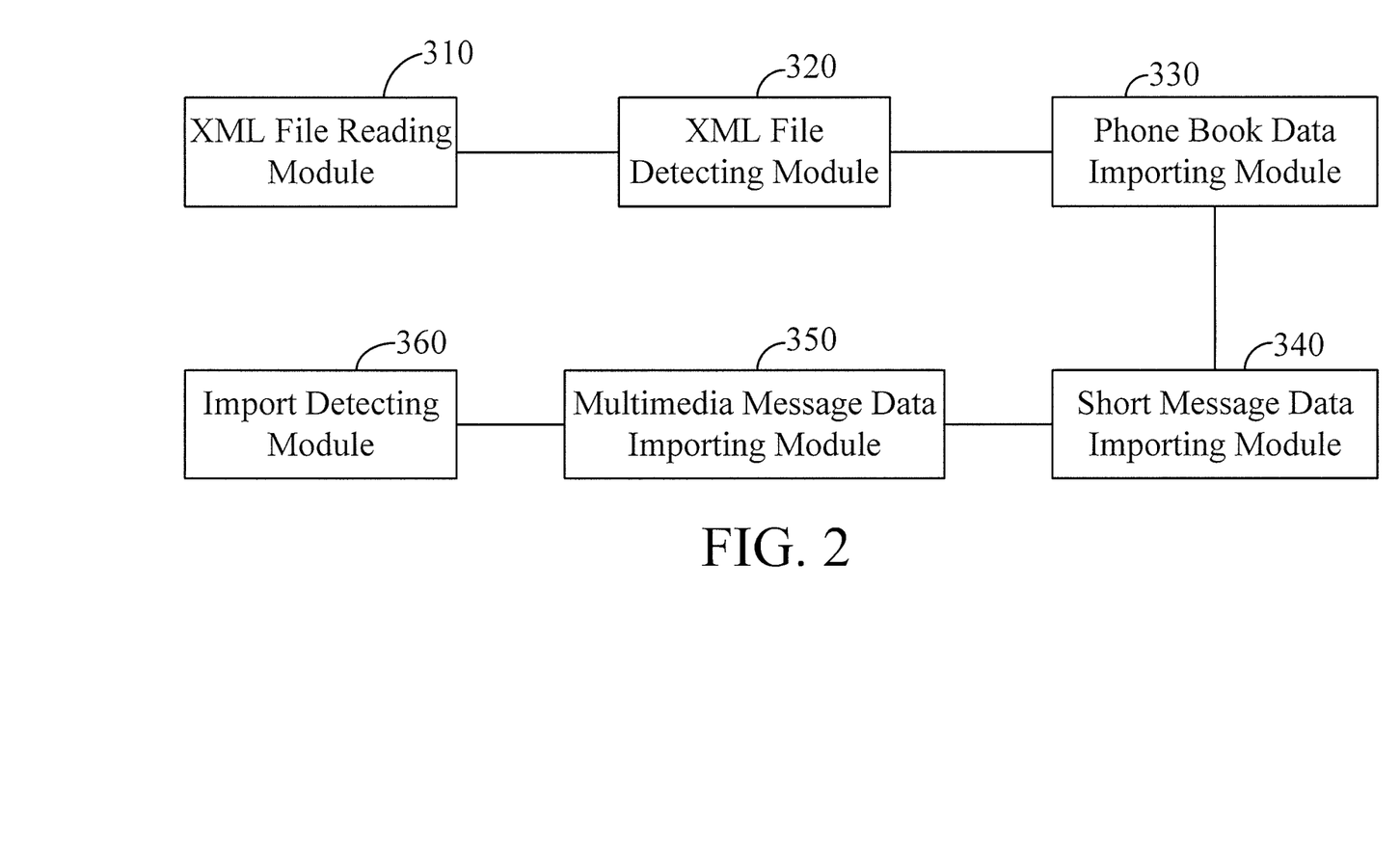
FIG. 2 is a block diagram of a device for importing backup data for a mobile terminal in accordance with an embodiment of the present invention.

Based on the method for importing backup data for the mobile terminal in accordance with the above embodiment, the embodiment of the present invention further provides a device for importing backup data for a mobile terminal so shown in FIG. 2, the device comprises:

an xml file reading module 310 for reading an xml file of pre-stored backup data of the mobile terminal;

an xml file detecting module 320 for detecting whether the read xml file of the pre-stored backup data of the mobile terminal is complete;

a phone book data importing module 330 for determining whether to import phone book data, and access a phone book import flow to import phone book data in the xml file to a phone book of the mobile terminal if yes;

a short message importing module 340 for determining whether to import short message data, and access a short message import flow to import short message data in the xml file to short messages of the mobile terminal if yes;

a multimedia message importing module 350 for determining whether to import multimedia message data, and access a multimedia message import flow to import multimedia message data in the xml file to multimedia messages of the mobile terminal if yes;

an import detecting module 360 for determining whether all the data have been completely imported, and ending the whole backup flow if yes.

Figure 3:
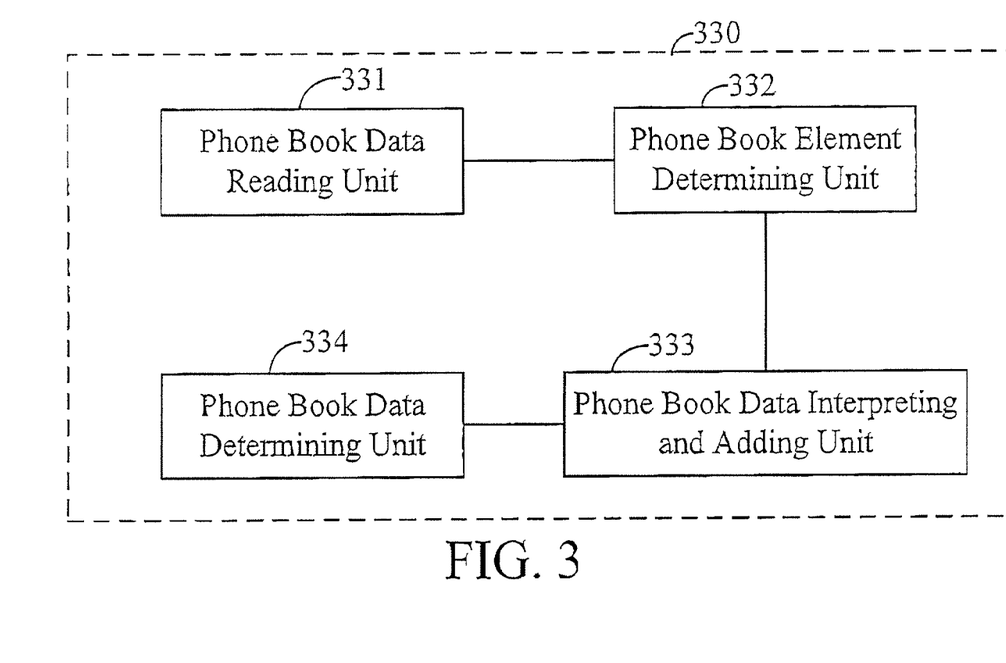
FIG. 3 is a block diagram of a phone book data importing module in accordance with an embodiment of the present invention.

Further, in the device for importing the backup data for the mobile terminal, as shown in FIG. 3, the phone book importing module 330 comprises:

a phone book reading unit 331 for reading a phone book element in the xml file;

a phone book element determining unit 332 for determining whether the read phone book element is valid;

a phone book data interpreting and adding unit 333 for interpreting the read phone book element into codes which are suitable for the mobile terminal to store, and adding the interpreted phone book data to a phone book of the mobile terminal;

a phone book data determining unit 334 for determining whether the phone book data have been completely imported.

Figure 4:
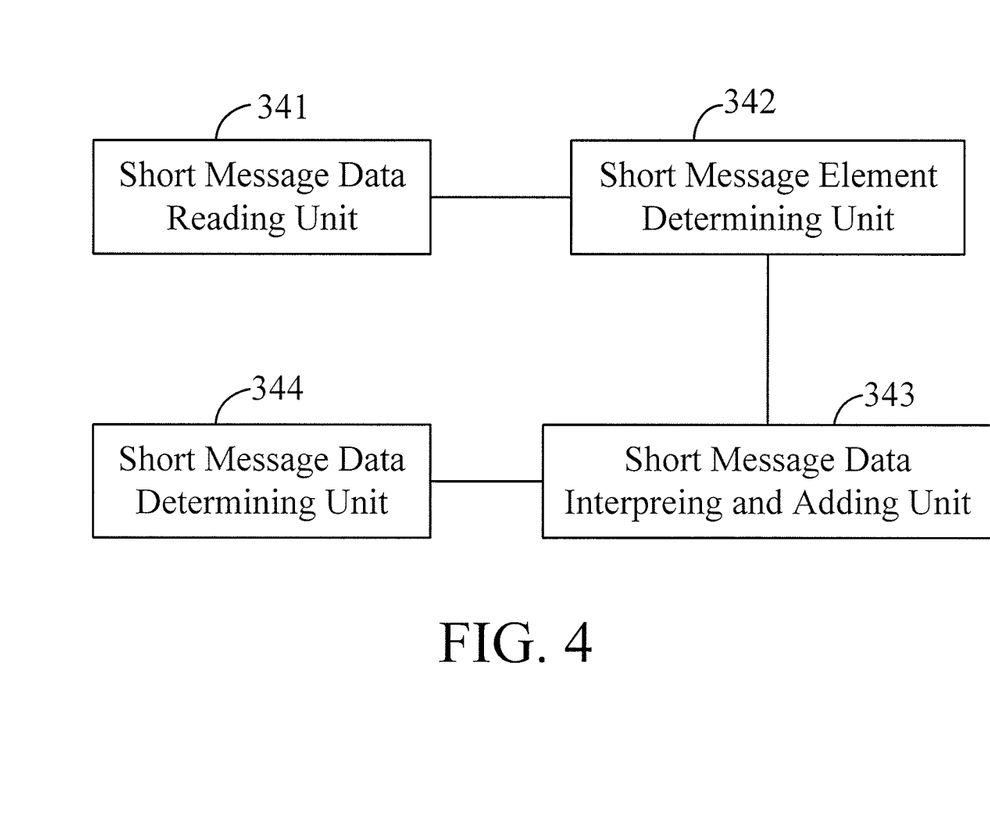
FIG. 4 is a block diagram of a short message data importing module in accordance with an embodiment of the present invention.

Further, as shown in FIG. 4, the short message data importing module 340 comprises:

a short message reading unit 341 for reading a phone book element in the xml file;

a short message element determining unit 342 for determining whether the read short message element is valid;

a short message data interpreting and adding unit 343 for interpreting the read short message element into codes which are suitable for the mobile terminal to store, and adding the interpreted short message data to short messages of the mobile terminal;

a short message data determining unit 344 for determining whether the short message data have been completely imported.

Figure 5:
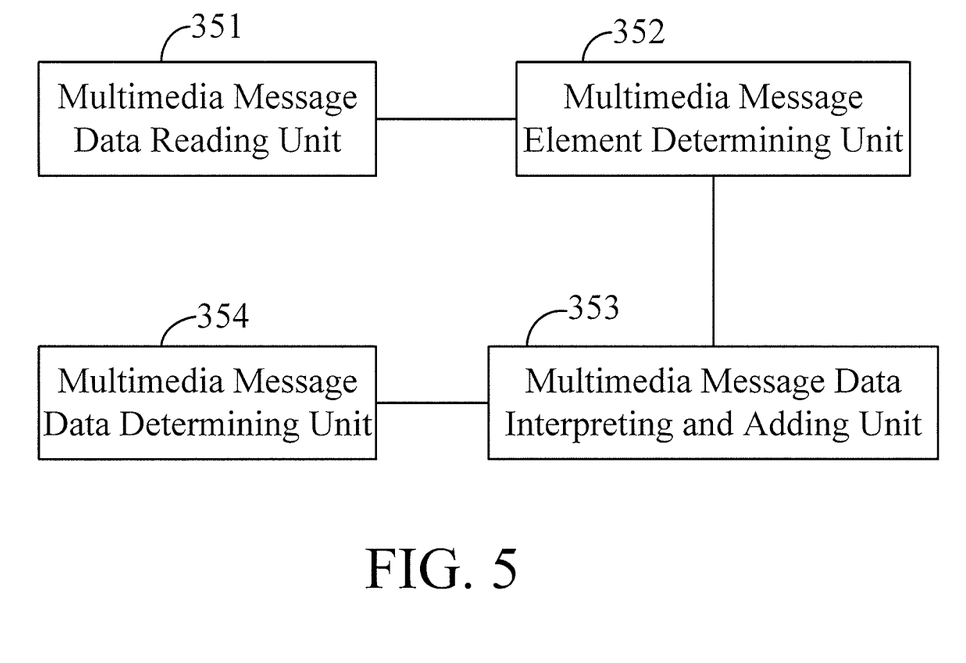
FIG. 5 is a block diagram of a multimedia message data importing module in accordance with an embodiment of the present invention.

As shown in FIG. 5, the multimedia message data importing module 350 comprises:

a multimedia message reading unit 351 for reading a phone book element in the xml file;

a multimedia message element determining unit 352 for determining whether the read multimedia message element is valid;

a multimedia message data interpreting and adding unit 353 for interpreting the read multimedia message element into codes which are suitable for the mobile terminal to store, and adding the interpreted multimedia message data to multimedia messages of the mobile terminal;

a multimedia message data determining unit 354 for determining whether the multimedia message data have been completely imported.

In the method and device for importing backup data for the mobile terminal in accordance with the above embodiment, the formal of the xml file is defined as: the xml file is encoded using UTF-8, version 1.0, where elements thereof are as follows:

1) Root element, it contains sub-elements such as PHB, SMS, MMS;

2) PHB element, it represents an item of the PHB. The element includes values such as a surname, a given name, a mobile phone number, a home phone, a office phone, an email address; that is, the PHB data comprise surname data, given name data, mobile phone number data, home phone data, office phone data and/or email address data.

3) SMS element, it represents an item of the SMS. The element comprises values such as a sender's number, time, and message content; that is, the SMS data comprise sender's number data, short message time data and/or message content data.

4) MMS element, it represents an item of the MMS. The element comprises values such as a sender's number, time, a text message content, an image path, a video path and an audio file path. That is, the MMS data comprise sender's number data, multimedia message time data, text message content data, image path data, video path data and/or audio file path data.

When preparing the backup of or importing MMS, MMS may include converged multimedia files such as an image, video and audio. These files cannot be stored in the xml file. They can only be stored in another way. The xml file only stores corresponding paths of these files.

Furthermore, concerning encryption of the backup files, in consideration of safety of personal messages, the backup files need to be encrypted. However, the import and export flows do not involve such a field, and therefore it is not discussed here. If encryption is needed, it is only necessary to add an encrypting procedure and a decrypting procedure to the import and export flows correspondingly.

As recited above, the present invention provides a method and a device for importing backup data for a mobile terminal, which is convenient for a user to manage, simple to operate and easy to implement since the message data of the mobile terminal pre-stored in the xml file are used and classified to be imported to the mobile terminal.

It should be understood that the applications of the present invention are not limited by the above embodiments. Modifications and alterations can be made by persons skilled in this art, and those modifications and alterations are within the scope as defined in the appended claims.

What is claimed is:

1. A method for importing backup data for a mobile terminal, the method comprises steps of:
    A. reading an xml file of pre-stored mobile terminal backup data, and checking if the xml file is complete, going to step F if no complete, and going to step B if complete, wherein the xml file is encoded using UTF-8;
    B. determining whether to import phone book data, if yes, accessing a phone book importing flow to import the phone book data in the xml file to a phone book of a mobile terminal, and going to step E after the phone book importing flow is completed; if no, accessing a short message importing determination and going to step C;
    C. determining whether to import short message data, if yes, accessing a short message importing flow to import the short message data in the xml file to short messages of the mobile terminal, and going to step E after the short message importing flow is completed; if no, accessing a multimedia message importing determination and going to step D;
    D. determining whether to import multimedia message data, if yes, accessing a multimedia message importing flow to import the multimedia message data in the xml file to multimedia messages of the mobile terminal, and going to step E after the multimedia message importing flow is completed; if no, going to step F;
    E. determining whether imports of all data have been completed, if no, returning to step B to execute a determination for a next classification, and if yes, going to step F; and
    F. ending the above-mentioned importing flows in steps B-D.

2. The method for importing backup data for the mobile terminal according to claim 1, wherein the phone book data importing flow in step B particularly comprises steps of:
    B1. reading phone book elements in the xml file one by one;
    B2. determining if a read phone book element is valid, if no, returning to step B1 to read a next phone book element, and if yes, going to step B3;
    B3. interpreting the read phone book element into codes being suitable for the mobile terminal to store, and adding the interpreted phone book data to the phone book of the mobile terminal; and
    B4. determining if the import of the phone book data is complete, if no, returning to step B1, and if yes, going to step E.

3. The method for importing backup data for the mobile terminal according to claim 1, wherein the short message importing flow in step C particularly comprises steps of:
    C1. reading short message elements in the xml file one by one;
    C2. determining if a read short message element is valid, if no, returning to step C1 to read a next short message element, and if yes, going to step C3;
    C3. interpreting the read short message element into codes being suitable for the mobile terminal to store, and adding the interpreted short message data to the short messages of the mobile terminal; and
    C4. determining if the import of the short message data is complete, if no, returning to step C1, and if yes, going to step E.

4. The method for importing backup data for the mobile terminal according to claim 1, wherein the multimedia message importing flow in step D particularly comprises steps of:
    D1. reading multimedia message elements in the xml file one by one;
    D2. determining if a read multimedia message element is valid, if no, returning to step D1 to read a next multimedia message element, and if yes, going to step D3;
    D3. interpreting the read multimedia message element into codes being suitable for the mobile terminal to store, and adding the interpreted multimedia message data to the multimedia messages of the mobile terminal; and
    D4. determining if the import of the multimedia message data is complete, if no, returning to step D1, and if yes, going to step E.

5. The method for importing backup data for the mobile terminal according to claim 1, wherein the phone book data comprise surname data, given name data, mobile phone number data, home phone data, office phone data and/or email address data.

6. The method for importing backup data for the mobile terminal according to claim 1, wherein the short message data comprise number data of a sender, short message time data and/or message content data;
    the multimedia message data comprise number data of a sender, multimedia message time data, text message content data, image path data, video path data and/or audio file path data.

7. A device for importing backup data for a mobile terminal, the device comprises:

an xml file reading module for reading an xml file of pre-stored mobile terminal backup data, wherein the xml file is encoded using UTF-8;

an xml file detecting module for detecting if the read xml file of the pre-stored mobile terminal backup data is complete;

a phone book data importing module for determining whether to import phone book data, and if yes, accessing a phone book data importing flow to import the phone book data in the xml file into a phone book of the mobile terminal;

a short message data importing module for determining whether to import short message data, and if yes, accessing a short message importing flow to import the short message data in the xml file into short messages of the mobile terminal;

a multimedia message data importing module for determining whether to import multimedia message data, and if yes, accessing a multimedia message importing flow to import the multimedia message data in the xml file into multimedia messages of the mobile terminal; and an import detecting module for determining whether all the data have been completely imported, and if yes, ending the phone book data importing flow, the short message importing flow, and the multimedia message importing flow.

8. The device for importing backup data for the mobile terminal according to claim 7, wherein the phone book data importing module comprises:

a phone book data reading unit for reading a phone book element in the xml file;

a phone book element determining unit for determining whether the read phone book element is valid;

a phone book data interpreting and adding unit for interpreting the read phone book element into codes being suitable for the mobile terminal to store and adding the interpreted phone book data into the phone book of the mobile terminal; and a phone book data determining unit for determining whether the phone book data have been completely imported.

9. The device for importing backup data for the mobile terminal according to claim 7, wherein the short message data importing module comprises: a short message data reading unit for reading a short message element in the xml file; a short message element determining unit for determining whether the read short message element is valid; a short message data interpreting and adding unit for interpreting the read short message element into codes being suitable for the mobile terminal to store and adding the interpreted short message data into the short messages of the mobile terminal; and a short message data determining unit for determining whether the short message data have been completely imported;

the multimedia message data importing module comprises: a multimedia message data reading unit for reading a multimedia message element in the xml file; a multimedia message element determining unit for determining whether the read multimedia message element is valid; a multimedia message data interpreting and adding unit for interpreting the read multimedia message element into codes being suitable for the mobile terminal to store and adding the interpreted multimedia message data into the short messages of the mobile terminal; and a multimedia message data determining unit for determining whether the multimedia message data have been completely imported.

10. A method for importing backup data for a mobile terminal comprising:

reading an xml file, in which the backup data for the mobile terminal are stored, the backup data being classified into a plurality of classifications, wherein the xml file is encoded using UTF-8;

determining whether to import each classification of the backup data to the mobile terminal;

importing the classification of the backup data to the mobile terminal if it is determined so, wherein the classifications of the backup data are classified to be imported to the mobile terminal;

checking whether all of the classifications of the backup data in the xml file have been completely imported and returning to the determining step if not; and interpreting the backup data into codes suitable for the mobile terminal to store.

11. The method according to claim 10, wherein the backup data include phone book data.

12. The method according to claim 10, wherein the backup data include short message data.

13. The method according to claim 10, wherein the backup data include multimedia message data.

14. The method of claim 10, wherein each classification of the backup data comprises a plurality of elements, and the elements of each classification of the backup data are read element by element.

15. The method of claim 14, further comprising determining whether each element is valid, interpreting the element into a code suitable for the mobile terminal to store if valid and importing the interpreted element into the mobile terminal.

16. The method of claim 10, further comprising determining whether the xml file is complete before the reading step, wherein the xml file is read if it is complete.

* * * * *